(12) United States Patent
Or-Bach et al.

(10) Patent No.: US 6,988,079 B1
(45) Date of Patent: Jan. 17, 2006

(54) SYSTEM AND METHOD FOR AMALGAMATING MULTIPLE SHIPPING COMPANIES USING REUSABLE CONTAINERS AND WIDE AREA NETWORKS

(76) Inventors: Zvi Or-Bach, 3555 Woodford Dr., San Jose, CA (US) 95124; Dan Kikinis, 20264 Ljepava Dr., Saratoga, CA (US) 95070

( * ) Notice: Subject to any disclaimer, the term of this patent is extended or adjusted under 35 U.S.C. 154(b) by 536 days.

(21) Appl. No.: 09/642,358

(22) Filed: Aug. 21, 2000

Related U.S. Application Data (63) Continuation-in-part of application No. 09/524,060, filed on Mar. 13, 2000, and a continuation-in-part of application No. 09/481,783, filed on Jan. 11, 2000, now abandoned.

(51) Int. Cl.
*G06F 17/60* (2006.01)
*H04Q 7/00* (2006.01)

(52) U.S. Cl. .................. 705/28; 340/10.1; 340/10.2; 340/10.6; 705/22; 705/29; 709/202; 709/203; 709/224; 707/3; 707/10

(58) Field of Classification Search ............. 705/22, 705/28, 29, 1, 37; 340/10.1; 370/352
See application file for complete search history.

(56) References Cited

U.S. PATENT DOCUMENTS

| | | | | |
|---|---|---|---|---|
| 5,877,962 | A | | 3/1999 | Radcliffe ............... 364/478.04 |
| 5,920,287 | A | * | 7/1999 | Belcher et al. ............. 342/450 |
| 5,936,527 | A | * | 8/1999 | Isaacman et al. ........ 340/572.1 |
| 6,232,870 | B1 | * | 5/2001 | Garber et al. ............. 340/10.1 |
| 6,354,493 | B1 | * | 3/2002 | Mon ......................... 235/380 |
| 6,496,806 | B1 | * | 12/2002 | Horwitz et al. ............... 705/28 |
| 6,509,828 | B2 | * | 1/2003 | Bolavage et al. .......... 340/10.1 |
| 6,564,999 | B1 | | 5/2003 | Saveliev et al. ............ 235/383 |
| 6,572,016 | B2 | | 6/2003 | Saveliev et al. ............ 235/383 |
| 6,580,357 | B1 | | 6/2003 | Forster et al. ............. 340/10.1 |
| 6,714,121 | B1 | | 3/2004 | Moore ....................... 340/10.3 |

FOREIGN PATENT DOCUMENTS

EP           494114 A2 *   7/1992

OTHER PUBLICATIONS

Singer, Peter H., The Challenge: Automating the Industry, Technical Proceedings–Semion West '84 (Semiconductor International, May 1984) pp. 272–275.*
"PaxZone.com" documents downloaded from internet on Sep. 17, 2000, 51 pages.
New RFID Tag Chip Features Advanced Anti–Collision with Simulataneous Interrogation of 10 Tags.
Amanda Loudin, "RFID Comes Into Its Own".
FASTRAK and Other RFID Systems.
New 13.56 MHz Tag Opens RFID to New Applications Tag Provides High Performance at Low Cost.

* cited by examiner

*Primary Examiner*—James P. Trammell
*Assistant Examiner*—Daniel L. Greene (57) ABSTRACT

A system and method for delivering packages using a vehicle such as a truck. The packages contain RFIDs that can be electronically queried when the truck is at a destination. A computer communicates to the driver which packages are to be provided at the destination, and the RFIDs can be electronically queried so that the driver can identify those packages. The truck can have an RFID affixed thereto, so that when the driver arrives at the destination, a computer system is informed and can communicate said instructions to the driver. The instructions can be generated using a data base at a remote location coupled to a system within the truck (or within the destination).

8 Claims, 4 Drawing Sheets

SYSTEM AND METHOD FOR AMALGAMATING MULTIPLE SHIPPING COMPANIES USING REUSABLE CONTAINERS AND WIDE AREA NETWORKS

CROSS REFERENCE TO RELATED APPLICATIONS

This application is a continuation in part of our U.S. patent application Ser. Nos. 09/524,060 and abandoned, 09/481,783, filed Mar. 13, 2000 and Jan. 11, 2000, respectively. The '060 and '783 applications are incorporated by reference.

BACKGROUND OF THE INVENTION

This invention pertains to a system and method for tracking and shipping products in commerce. This invention also pertains to a system and method for tracking the shipping, delivery and the returning of shipping containers and the products within those containers.

Businesses often deliver products to different stores, warehouses, businesses, homes and the like by trucks. Packages are generally loaded onto a truck, the truck driver is given a list of locations to drive to, and instructions as to what packages are to be delivered at these locations. Such a system has its disadvantages. For example, an entire itinerary must be given to the driver before he commences his trip, along with an entire list of which packages are to be delivered, and where they are to be delivered. The driver must know where, within the truck, the various packages are. There is a limit to the complexity of the tasks that can be given to the driver, or the extent to which the driver's tasks can be modified "on the fly". Because of this, companies may be under-utilizing their transportation and shipping resources.

SUMMARY

In accordance with one aspect of the invention, a group of packages are shipped as part of a goods delivery system via a vehicle such as a truck. The packages typically contain or are affixed to identification means, e.g. a radio frequency identification (RFID) tag. A computer database is provided for tracking the location of the packages. When the vehicle arrives at a destination, a list of transactions is provided, e.g. by printing or other display technique, at the destination. This list can include, for example, a list of those packages to be delivered to the destination, and a list of packages to be picked up at the destination. A scanner is used to scan the RFID associated with each package being delivered. (The scanner provides a radio signal querying the RFID. The RFID responds by providing a signal identifying the package associated with that RFID.) The database tracking the location of the packages is automatically updated in response to that scanning. In this way, the location of the packages can be tracked in a manner that minimizes or eliminates human error. Thus, an up-to-date list of the location of each package within the delivery system can be generated and accessed.

In one embodiment, a first computer system and RFID scanner are located at the destination. The first computer system can interface with a second computer system (e.g. at another location) to update a database tracking the location of the various packages. The interfacing between the first and second computer systems can be through a network, e.g. a wide area network such as the internet.

In accordance with another aspect of the invention, the vehicle transporting the group of packages contains apparatus for locating an individual package. The apparatus comprises a transmitter for transmitting a signal (typically a radio signal) that queries a RFID within or affixed to one of the packages. The queried RFID responds to the radio signal by transmitting a reply signal (also typically a radio signal). A receiving mechanism within the vehicle determines the location of the queried RFID in response to the reply signal, and identifies the location of the RFID (and hence the location of the package that the RFID is affixed to or contained within). A mechanism such as one or more light pointers or other location identifying structure indicates where within the vehicle that package is located.

In another embodiment, each RFID is coupled to a transducer for providing a visual or auditory output. When the RFID is queried, the RFID responds by either providing a visual output (e.g. an LED or other light source is illuminated) or an auditory output (e.g. a buzzer or other type of sound is emitted). In this way, the package that the RFID is contained within or affixed to can be easily located within the vehicle.

The system of the present invention can be used to augment delivery systems. For example, a company with one or more trucks previously used to deliver products for that one company, or one vendor, can make better use of those trucking resources by amalgamating those trucking resources into a larger system to deliver goods from several different sources. For example, a company that previously used its trucks to deliver a product like stacks of newspapers to newspaper stands can now make better use of its resources by amalgamating those trucking resources into a larger system to deliver different products as well. This results in better use of those trucking resources by permitting extra revenue to be derived therefrom. For example, those trucks can be used during times outside the time slots when newspapers are normally delivered so that they can earn money for the truck owner. The system of the present invention assists in that amalgamation of trucking resources. In particular, this system assists the driver in determining what packages are to be delivered at a particular location, thereby simplifying the task for the driver even though the complexity of the delivery task has been increased.

These and other advantages of the present invention will be better understood with reference to the detailed description below.

DETAILED DESCRIPTION
A System in Accordance with the Invention

Figure 4:
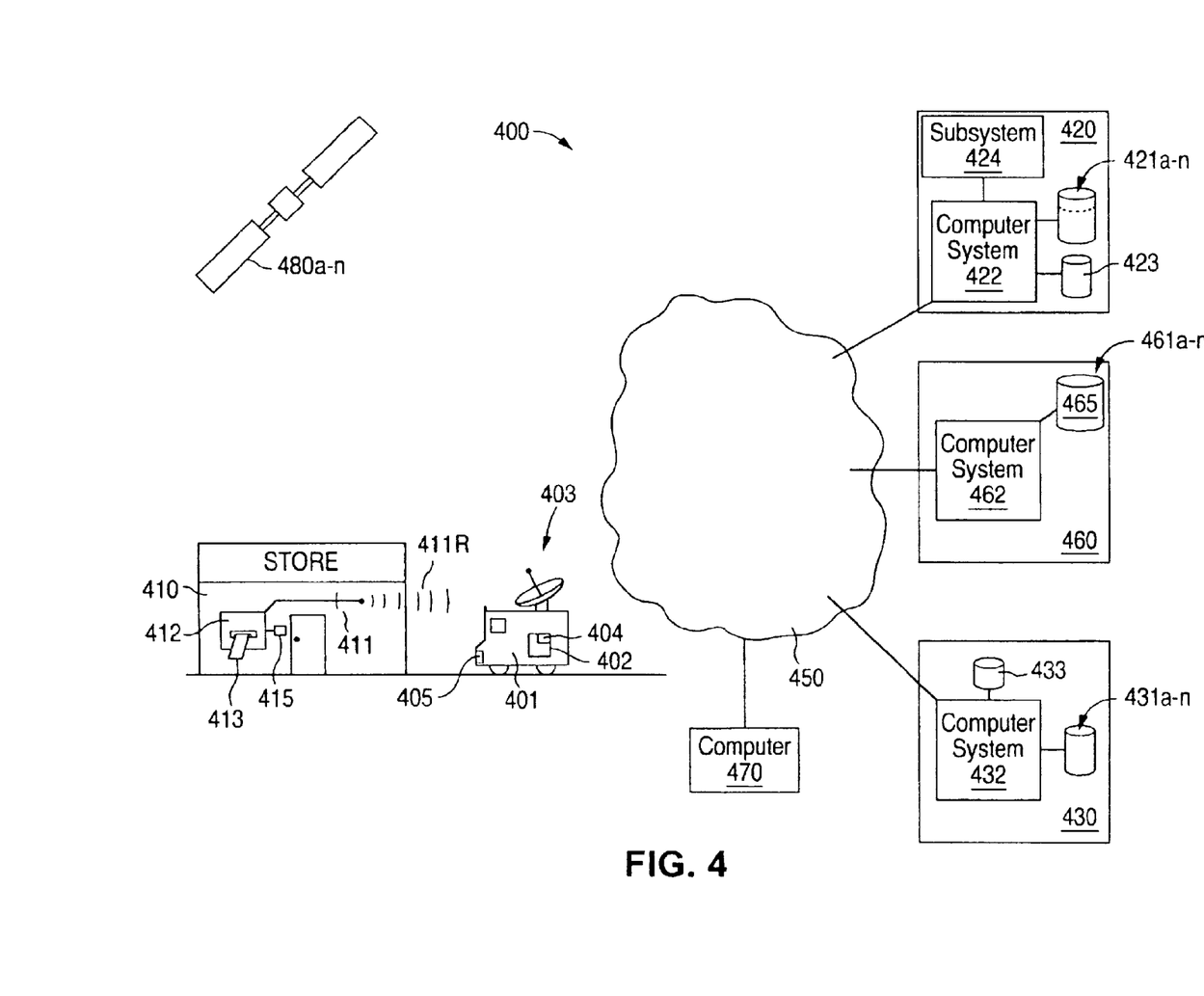
FIG. 4 illustrates a system for delivering packages in accordance with the present invention.

FIG. 4 schematically shows a system 400 in accordance with the invention for transporting packages or goods. System 400 amalgamates the shipping resources of a plurality of entities (e.g. a plurality of companies). In one embodiment, system 400 comprises a central computer system 462 (housed at a location 460) for keeping track of the orders placed within system 400, the packages delivered by system 400, and the location of the various packages to be delivered by system 400. (Computer system 462 can also track the invoicing that needs to be done when a package is delivered by the system.) A memory device 465 electrically coupled to computer system 462 maintains one or more databases 461a–containing this information. Computer system 462 will be referred to hereafter as the "system integrator". System integrator 462 receives requests for shipping packages by any of a number of means. For example, system integrator 462 can be coupled to a network such as a wide area network ("WAN") 450. WAN 450 can be the internet. Thus, in one embodiment, a user can access system integrator 462 by accessing system integrator 462's URL and communicating an order via WAN 450, requesting that a particular package be delivered. For example, a user may have a computer 470 coupled to WAN 450, and may use computer 470 to place the request with system integrator 462 via WAN 450. The user can be an individual or a company. In a first embodiment, system integrator 462 will instruct one of the vehicles within the system to pick up the package from the user's location for delivery to a destination. In a second embodiment, the package can be dropped off at a central depot by the user, where it will be loaded onto a vehicle for delivery. (In this second embodiment, the order can be entered into the databases of system integrator 462 by personnel at the central depot when the package is dropped off.) The vehicle can be a truck such as truck 401. Alternatively, the vehicle can be something other than a truck.

As seen in FIG. 4, truck 401 transports a package 402 to a store 410. (Although only one package is shown in truck 401, truck 401 typically transports numerous packages. Also, although only one truck is shown in FIG. 4, system 400 typically comprises several trucks, and in fact, can comprise many trucks. The trucks are typically owned by several different companies. As mentioned above, each truck within the system can receive instructions from system integrator 462 to pick up or deliver packages to a destination.)

A radio frequency ID tag ("RFID") (schematically shown at reference number 404) is either attached to or contained in package 402. (An RFID is a tag that can be placed in or on a package. The tag can be electronically queried by sending a radio signal to the RFID. The tag responds to this query by sending a response radio signal. RFIDs are discussed in greater detail below.) Package 402 can be a reusable container as described in the '060 application and discussed below.

Store 410 can be of a type described in the '060 and '783 applications. (These applications describe a store that is part of a distribution system in which goods can be ordered by a purchaser from numerous vendors via a wide area network ("WAN") such as the internet. These goods are collected from the various vendors and provided at the store for pickup by the purchaser. This system is described in greater detail below.)

In one embodiment, another RFID tag 405 is affixed to truck 401. A scanner 411 mounted (or merely located) in store 410 detects the arrival of truck 401 by transmitting RF signals 411R (symbolically shown in FIG. 4). These signals are received by RFID 405, which provides response signals to scanner 411 to inform scanner 411 that truck 401 has arrived. Alternatively, or in addition thereto, scanner 411 can scan and detect RFID 404 affixed to or within package 402. (As mentioned above, truck 401 typically contains many packages having RFID tags contained therein or affixed thereto. Accordingly, scanner 411 can scan and detect all such RFIDs.)

In response to detection of the arrival of truck 401, the store's computer 412 generates a list 413 of required transactions using one or more databases 421a–n. (List 413 can be provided in the form of a hard copy, or in the form of a display output, e.g. a CRT or LCD screen output or other form of output.) Databases 421a–may be physically located at a site remote from store 410, e.g. the headquarters 420 of the company that provides the goods shipped via truck 401 (or one of the companies that provides the goods shipped via truck 401). Databases 421a–n can be stored within memory devices (e.g. one or more magnetic, magneto-optic or optical disk drives, semiconductor memory devices or other types of memory devices) connected to one or more computers 422 located at or electronically coupled to headquarters 420. Software 423 is used to control computers 422.

In lieu of or in addition to databases 421a–n, list 413 of required transactions can also be generated using databases 431a–n at the company 430 that operates truck 401. (This can be a company that is the same as or different from the company that is providing the goods shipped within truck 401.) Databases 431a–n are accessed by one or more associated computers 432 that run under the control of software 433.

In lieu of or in addition to databases 421a–n, list 413 of required transactions can also be generated using databases 461a–n of system integrator 462.

Connection between computer 412 and databases 421a–n (and/or databases 431a–n and/or databases 461a–n) is made via a network, e.g. a wide area network such as WAN 450 (e.g. the internet). In particular, computer 412 is coupled to one or more of computers 422, 432, and/or 462 via WAN 450, and computers 422, 432, and 462 are coupled to the memory devices containing databases 421a–n, 431a–n, and 462a–n, respectively. List 413 indicates which packages need to be unloaded from truck 401 and delivered to store 410, as well as which packages located at store 410 need to be picked up by truck 401.

In some embodiments a global positioning system ("GPS") 403 is mounted on truck 401. GPS 403 can be used in addition to, or in lieu of, RFID 405 to track the position of truck 401 and notify the store 410 of the arrival of truck 401 and its contents (or to notify store 410 of the truck's impending arrival). Truck mounted GPS 403 typically comprises at least one of many possible types of wireless connections to the WAN 450. For example, GPS 403 can communicate with WAN 450 via satellite 480a–n (symbolically shown as a GPS satellite), but other appropriate wireless communication systems can be used.

Using one of several methods described later (FIG. 5A), a person doing the transactions set forth on list 413 (e.g. the truck driver or store employees) may be aided in quickly and accurately finding the correct packages within truck 401 to be delivered to store 410. During or upon completion of these transactions, the relevant databases are updated (e.g. databases 421a–n, 431a–n, 461a–n and/or any databases within computer 412) to reflect that the packages have been delivered. In some cases, databases in the several companies involved (e.g. the company owning store 410, the company providing the packages, the company that owns truck 401, or the company owning system integrator 462) are updated. The updating of these databases can occur by having the person doing these transactions manually entering data into a terminal coupled to computer 412. Alternatively, the databases can be updated using a scanner 415 that automatically queries the RFID within or affixed to the package being delivered to store 410. Scanner 415 receives a response radio signal from the RFID confirming that package 402 is being delivered to store 410. Scanner 415 is coupled to and provides a signal to computer 412, which updates the databases in response thereto. (In one embodiment, computer 412 updates databases 421*a–n* indirectly, by informing computer 422 via WAN 450 of the transactions so that computer 422 can update databases 421*a–n*.) Similarly, computer 412 updates databases 431*a–n* indirectly, by informing computer 432 via WAN 450 of the transactions so that computer 432 can update databases 431*a–n*. Similarly, computer 412 updates databases 461*a–n* by informing system integrator 462 of the package delivery. System integrator 462 can initiate invoices to the party or parties that requested delivery of the packages in response to being notified of the completion of the transactions. (Alternatively, the computer system of the company providing the packages or the company owning truck 401 can do the invoicing.)

As mentioned above, prior to delivery of package 402, databases 421*a–n* and/or databases 431*a–n* and/or databases 461*a–n* track the location of package 402, and include entries indicating that package 402 is located within truck 401. This entry can be provided automatically. In particular, as a package is being loaded within truck 401, it can be scanned with an RFID scanner at the location where the truck is being loaded (not shown in FIG. 4). This RFID scanner is coupled to computer 422 and/or 432 and/or 462 (either directly or indirectly, e.g. via WAN 450) to update databases 421*a–n* and/or 431*a–n* and/or 461*a–n* to reflect the fact that package 402 is being placed in truck 401. The location where package 402 is loaded onto truck 401 can be a warehouse as discussed below.

The above-described system and method allow precise tracking of the locations of the packages delivered by truck 401 as well as other trucks, when these packages have been delivered, and where they have been delivered. In addition, for a system as disclosed in the '060 and '783 applications (discussed below), this can also facilitate alerting the purchaser who ordered the goods when a package is available for pickup. Based on those updates, the system (e.g. one of computers 412, 422, 432, 462 or another computer in one of locations 410, 420, 430 and/or 460, or another computer linked to one of computers 412, 422, 432 or 462) can send a message to the purchaser who ordered the goods. (This message can be sent in response to the detection of the arrival of truck 401 as discussed above, or in response to the completion of the transaction as discussed above. Alternatively, the message can be sent when truck 401 leaves the above-mentioned warehouse.) Thus, the system (e.g. one of computers 412, 422, 432 or 462) can initiate a phone call, page, cell-phone call, e-mail, WAP message transmission (wireless application protocol as described at www.wapforum.org), SMS (short message system, which is a system for sending and receiving messages via a cell phone), or other message transmission technique. (FIG. 4 shows a subsystem 424 for initiating a message to a buyer as described above. Subsystem 424 is shown as being within location 420, but subsystem 424 could be located elsewhere within the system, e.g. at location 430, 460 or store 410.)

As described below, store 410 and company 420 can be part of a larger distribution network by which goods from different vendors are consolidated and provided to a single pickup-point (e.g. store 410) for pickup by a purchaser. As mentioned above, the system that sends the above-mentioned message to the purchaser can be either a local computer system associated with store 410 or company 420. Alternatively, the computer that sends this message can be a central system that notifies purchasers for the entire distribution network.

Although one embodiment uses a truck, in other embodiments, other types of vehicles can be used, e.g. airplanes, busses, scheduled trucks, railroads or other kind of transport. The form of transport can be either transport that runs according to a regular schedule or it can be transport that does not run according to a regular schedule. Combinations of different types of vehicles can be used, with little effort, by extensively using the feature of a public WAN, such as the internet, and integrating the use of these different vehicles. The integration of such different vehicles can be facilitated by using either proprietary or off-the-shelf planning software (e.g. MS Project™), parameterized to solve the scheduling problems. A fixed scale compensation may be applied, or a sliding scale reflecting supply and demand, or a mixture for both. (In other words, a fixed rate for the use of the transportation, e.g. a certain number of dollars per pound per mile can be employed. Alternatively, a rate that results from day-by-day bidding can be used. In other words, users of the shipping resources of the system can submit bids to the system and requesting delivery by one of the vehicles within the system. Different companies within the system can receive those bids, and either agree to perform the delivery or decline to perform the delivery. This can be done by submitting bids to a computer system coupled to network 450.) This allows creation of a powerful delivery system that may also be used by businesses, rather than just consumers. As the packages are loaded onto and taken off of the various transport vehicles, they can be scanned by a scanner that is coupled to computers 422 and/or 432 and/or 462 for updating of databases 421*a–n*, 431*a–n* and/or 461*a–n*.

While the description above refers to one truck 401, typically numerous trucks and/or other vehicles are used to deliver packages containing or being affixed to RFIDs. Databases 421*a–n* and/or 431*a–n* and/or 461*a–n* monitor the locations of the packages in the various trucks in the manner described above. As mentioned above, some of these vehicles may be from different companies. Thus, each company will typically maintain its own database listing each vehicle and what packages are being transported by its vehicles. In some cases however, the individual companies may choose not to do so, but rather rely on databases 461*a–n* of system integrator 462 for tracking its vehicles. As packages (items) are loaded onto and removed from the vehicles, the databases at the companies owning those vehicles are updated, e.g. via WAN 450 as well as the system integrator 462's database 461*a–n*. In addition, in one embodiment, centrally located database (e.g. 461*a–n*), which maintains the overall system, is also updated. Database 461*a–n* is also accessed and updated via WAN 450. In one embodiment, database 461*a–n* can be accessed by any of the companies making up system 400 or users of system 400 so that the location of the various vehicles of or packages being shipped by system 400 can be tracked.

As mentioned above, a series of two or more vehicles can be used to transport a package. For example, a first vehicle can transport the package from a first location to an intermediate location, whereas as second vehicle can transport the package from the intermediate location to a final location. Also as mentioned above, one or more of these vehicles can be something other than a truck. Each of these vehicles can be owned and managed by either a common company or different companies. However, the company owning or managing each vehicle typically maintains a database accessible by WAN 450. A user desiring to use the resources of the first and second vehicles can contact a published number such as an 800 number, or contact a web page, or use another method for communicating with system integrator 462, or contact or use a business that has contracted with the company owning system integrator 462 to fulfill its deliveries. Thus goods can be shipped to the farthest places, using local, untapped resources to do transporting.

In the case of contacting a business, several scenarios are possible. First, a retailer selling over the internet, mail or telephone orders etc., may use the system integrator to have goods delivered to a customer or to a location near the customer for pick-up (such as a supermarket etc.). Second, a company or location that is to receive a package may use the system integrator to have the goods delivered to that company/location.

In some cases, the company running the system integrator may be a large retailer or may run a portal for remote commerce (e.g. e-commerce, mail orders, telephone orders etc.). Alternatively, the company running the system integrator may own a vast network of outlets, such as supermarkets, drugstores, convenience markets etc. In yet other cases the company running the system integrator may be completely independent, offering an array of shipping and marketing services.

As explained below, in one embodiment, retail outlets can serve as delivery locations where customers can come and pick up packages that they ordered. By bringing customers into the retail outlets to pick up packages the outlets have the chance to sell other items to that customer when he or she arrives to pick up their package.

One key advantage of this invention is the ability to query databases 421*a*–*n*, 431*a*–*n* and/or 461*a*–*n* to locate various packages. This querying can be done by personnel at locations 420, 430, 460 and/or store 410, e.g. via computers 422, 432, 462 and/or 412, respectively. Alternatively, individuals can query databases 421*a*–*n*, 431*a*–*n* and/or 462*a*–*n* at other locations by contacting computers 422, 432, 462 and/or 412 via a network. This network can be the same as or different from WAN 450. Also, this network can be a public network such as the internet. Thus, a purchaser can track the location and status of merchandise as it is shipped through the delivery system.

Finally, the system described above assumes that the company running system integrator 462 is different from the company providing the packages or the trucks. However, this need not be the case. The company running system integrator 462 can also have its own trucks within system 400. This company can also provide some or all of the packages being delivered by the trucks.

Structure and Method for Locating Packages Within Truck 401

Figures 5A, 5B:
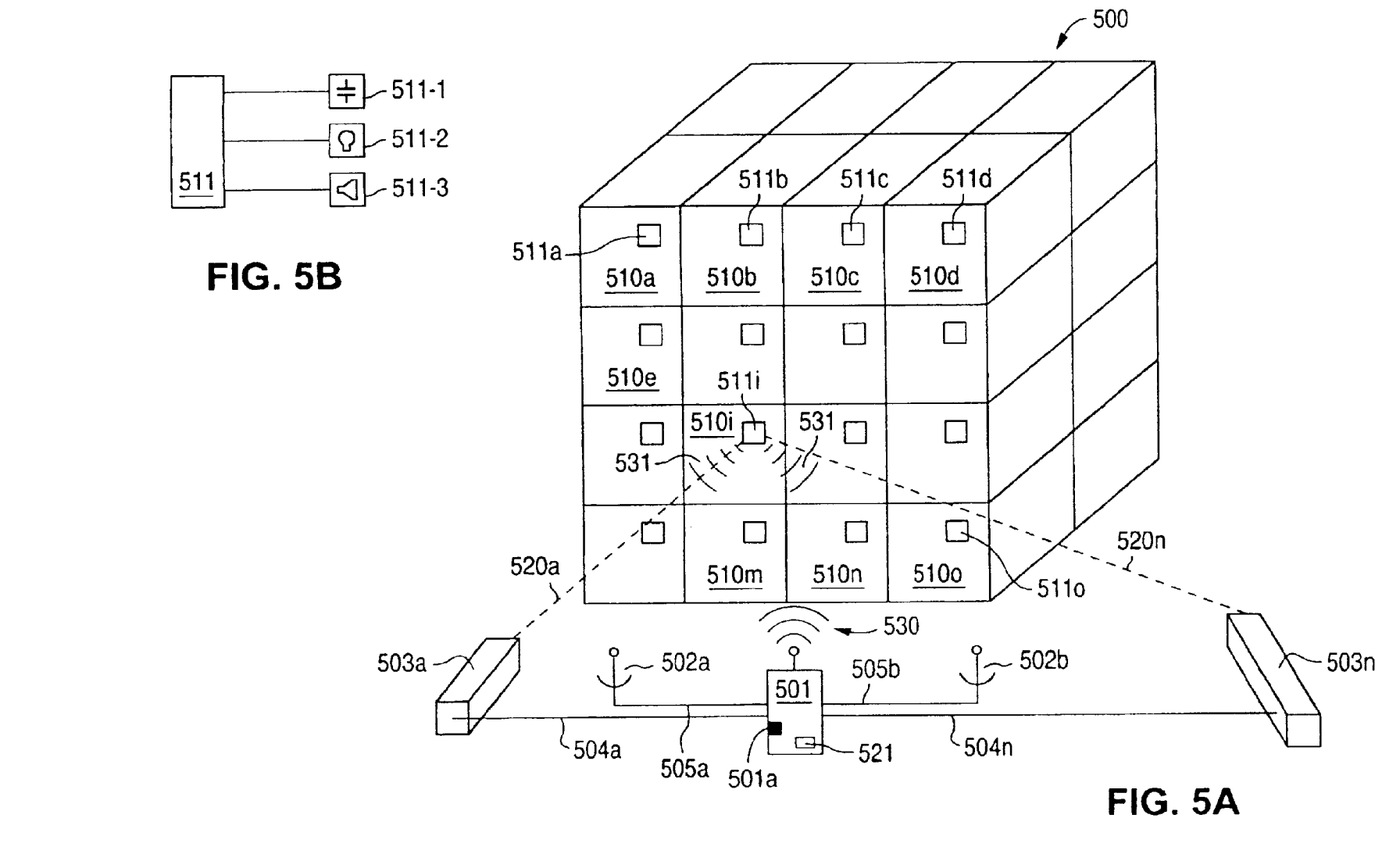
FIG. 5A illustrates apparatus for locating a package within a pile of packages.
FIG. 5B illustrates a modified RFID apparatus in accordance with the present invention.

FIG. 5A shows a simplified example of a method and apparatus for locating a desired package within a stack of packages in accordance with the invention. A remote scanning unit 501 transmits radio pulses 530 at a pile of packages 500, containing in this example sixteen packages 510*a*–*o*, each either containing or being affixed to an associated RFID 511*a*–*o*. In this example package 510*i* is sought. Its associated RFID 511*i* provides a response 531 that is received by at least one and preferably two antennae 502*a*, 502*b* (in some embodiments more than two antennae). By measuring the difference between the time antenna 502*a* receives response 531 and the time antenna 502*b* receives response 531 the location of package 510*i* can be determined. Alternatively, by measuring the difference in the strength of the signal received by antenna 502*a* vs. 502*b*, or by measuring echoes of signal 531, or by a similar technique, the location of package 510*i* can be determined. The location of package 510 is then indicated to a user by adjusting one or more light beam sources 503*a*–*n* so that their light beams 520*a*–*n* (provided by sources 503*a*–*n*) point to the package. By "digging along those beams" the user will find package 510*i*. In one embodiment, light sources 503*a*–*n* are mounted on manipulating means such as stepper motors for pointing beams 520*a*–*n*. In such an embodiment, these motors are coupled to and controlled by a digital device, e.g. a microprocessor 521 within scanning unit 501, via a set of wires 504*a*–*n*. (Microprocessor 521 is also typically coupled to antennae 502*a*–*b* via wires 505*a*–*b*.) Microprocessor 521 receives the signal from antennae 502*a*–*b*, calculates the location of package 510*i*, and causes the stepper motors to point beams 520*a*–*n* toward package 510*i*. (In lieu of stepper motors, other appropriate actuators, e.g. solenoids, pistons, or other hydraulic, electric or pneumatic actuators as well as memory materials can be used.)

In some embodiments, the RFID is replaced by or augmented with a speaker or light-generating device (e.g. a lamp or LED) to provide an audible and/or visible response to an "identify yourself" radio signal provided by scanning unit 501. FIG. 5B schematically shows such a system, with RFID 511 (comprising a microchip and an antenna, not shown), an attached energy storage structure 511-1 (such as capacitor, battery, or a rechargeable battery with optional photocell), an indicator light 511-2 (such as an LED, light bulb, LCD or any other kind of visible indicator) and a sound emitter 511-3 (such as a speaker, buzzer etc.). Thus, in response to a radio signal from scanning unit 501, the RFID provides a visible and/or audible response that enables a user to quickly locate package 510*i*.

Scanning unit 501 contains a radio transmitter that provides signal 531 in response to actuation of control elements 501*a* (e.g. buttons, switches, or a numeric keypad) on unit 501. Control elements 501*a* permit a user to enter a package identification code into unit 501, which causes unit 501 to provide a signal that uniquely queries the RFID affixed to the package being sought. This code can be obtained from list 413 (FIG. 4).

Novel Product Distribution Chain Using an Embodiment of the Present Invention

In the above-mentioned '060 and '783 applications, a novel method of providing goods is disclosed. The present invention can be used in conjunction with this novel method of providing goods. Briefly, the '060 and '783 applications teach a system whereby a purchaser (e.g. an individual) can order goods from several different vendors via the internet, have the vendors send those goods to a central location where they will be collected and sent to a pick-up location where the purchaser can pick up the goods. Thus, the purchaser can make one trip to a pick-up location to pick up goods from several different vendors. A method and apparatus in accordance with the present invention is particularly adaptable for use with such a system. This system will now be described with respect to FIG. 1.

In a system in accordance with the '783 application, a purchaser places an order online from his or her net appliance (typically a personal computer 100, shown in FIG. 1), either at work or at home. Computer 100 is connected via an internet service provider (ISP) 102 to internet 101. (As mentioned above, in some embodiments WAN 450 can be the internet, but WAN 450 can be a network other than the internet.) The purchaser accesses internet 101 via computer 100 to order goods from a plurality of vendors. The vendors can be any of numerous types of vendors, e.g. vendors of groceries, electronic goods, hardware items, office supplies, appliances, furniture, gardening goods, clothing, perfume, etc.

Figure 1:
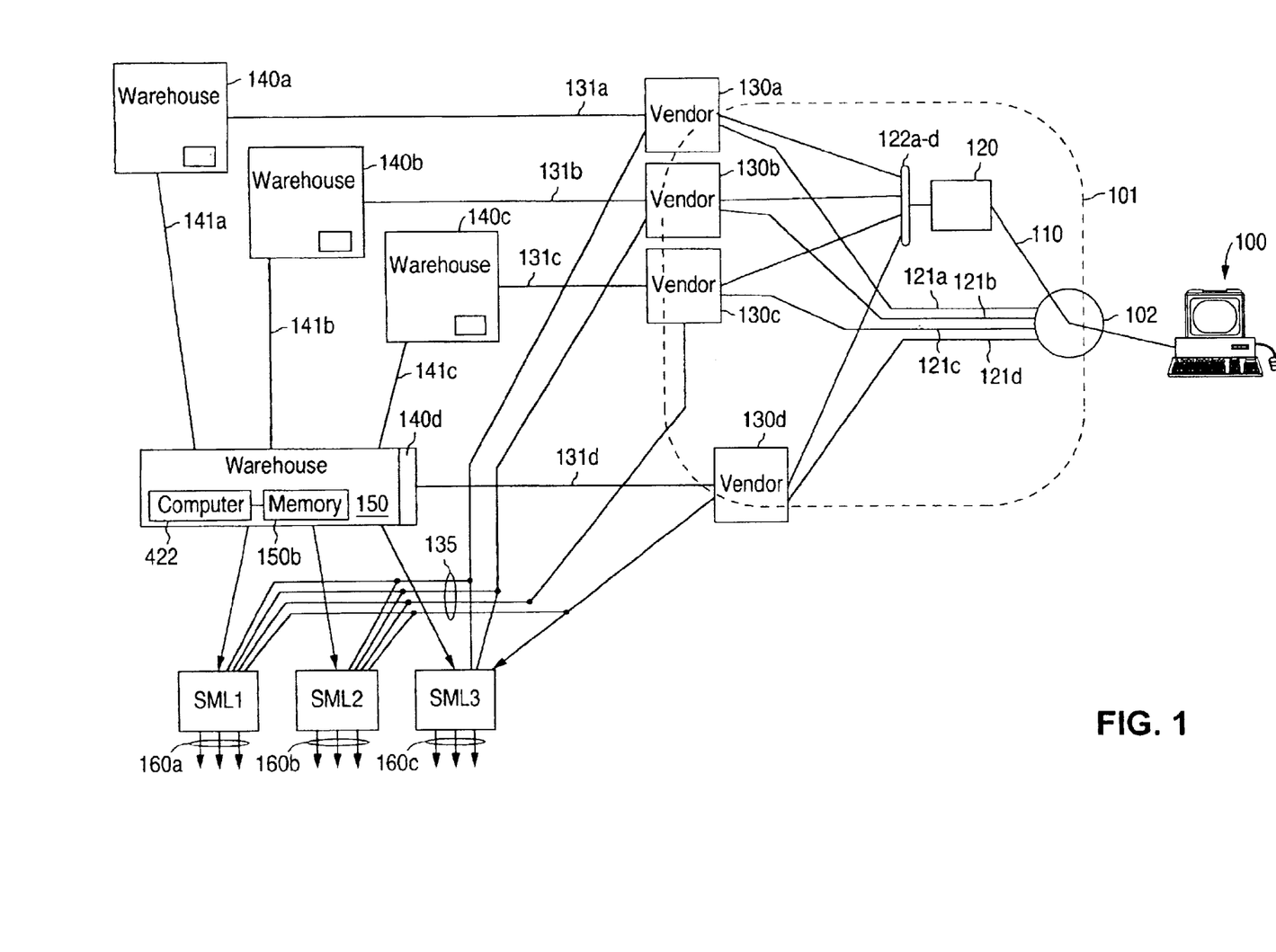
FIG. 1 is a block diagram illustrating a system for ordering goods and providing those goods to a purchaser through consolidated shipping in accordance with our '783 application.

The purchaser has several options for ordering these goods. For example, the purchaser can connect to a portal 120 via a connection 110. In one embodiment, portal 120 is a server. Connection 110 is invoked by accessing the URL (universal resource locator) of portal 120 in the same way that internet web pages are typically accessed. Portal 120 offers connections 122a to 122d to associated vendors, symbolized by boxes 130a to 130d, each having a server coupled for receiving orders from portal 120. Each vendor is typically an independent company. (The company headquartered at location 420 in FIG. 4 is typically the headquarters of one of vendors 130a to 130d. Each of the other vendors can have a computer and database system coupled to store 410 and/or system integrator 462 and/or computer system 432 in the manner described above with respect to FIG. 4.)

The purchaser communicates via portal 120 with vendors 130 to order goods from each vendor. The purchaser also typically instructs the vendors when the goods are to be picked up and the location from which the goods are to be picked up. As explained below, the purchaser has a choice of several central locations SML1 to SML3 from which he or she can pick up the goods. Locations SML1 to SML3 are typically stores similar to store 410 described above. (The servers of vendors 130 may provide availability information so that the purchaser can have an idea as to the earliest possible time for pick-up.) The purchaser can either pay for the goods at this point in the transaction using a credit card, or at the location and time of pick-up.

A purchaser also has the option of communicating with vendors 130a to 130d without going through portal 120, e.g. by accessing the servers of vendors 130a to 130d directly through the internet. This is symbolically illustrated by connections 121a to 121d for connecting ISP 102 directly to one or more of vendors 130a to 130d. In one embodiment, vendors 130a to 130d have their own internet web site, and are contacted via their URLs. A purchaser can use a bookmark in his or her browser, or contact vendors 130 using other types of application software running on internet appliance (e.g. PC) 100. Again, in this embodiment, the purchaser indicates when the goods are to be picked up, and where they are to be picked up from.

Optionally, the goods of each vendor 130 can have their own separate brand that identifies the point of origin of those goods separate and apart from the manner of distribution. Alternatively, a brand or trademark can be associated with the goods that indicate its origin in terms of the company providing the distribution mechanism. This brand can be applied to the various goods purchased using the method of the '783 application, even though the goods may have been manufactured or supplied by different vendors 130. Alternatively, the brand applied to the goods may reflect both the vendor 130 and the company providing the distribution mechanism.

Vendors 130a to 130d are examples of numerous vendors. However, there can be numerous vendors, a small number of vendors or only one vendor. The vendors can use common portal 120 or separate web sites.

Some of the links shown in FIG. 1 (e.g. links 110 and 121) are internet links. These links are not typically permanent, but rather, are established on a temporary basis, as is typical in use of the internet.

In the embodiment of FIG. 1, the servers of vendors 130a to 130c are electronically linked via connections 131a to 131c to their warehouses 140a to 140c. (Optionally, these servers may be physically located within warehouses 140.) These links permit vendors 130a to 130c to instruct their warehouses 140a to 140c to ship ordered goods to a regional warehouse 150 via shipping lines 141a to 141c. After consolidating the goods into a single order at warehouse 150, the consolidated order is forwarded to a selected one of exemplary supermarkets SML1 to SML3 for pickup. (The user typically selects the specific supermarket SML at the time of ordering.) Alternatively, vendors 130a to 130c can bypass warehouse 150 and ship ordered goods directly to one of exemplary supermarkets SML1 to SML3 for consolidation and pick-up. (In the embodiment of FIG. 1, establishments SML1 to SML3 are supermarkets. However, establishments SML1 to SML3 can be any kind of retail establishment.)

Vendor 130d uses a different technique, in that it has a warehouse 140d merged into regional warehouse 150. In some embodiments, there is only one regional warehouse. In other embodiments, there are many regional warehouses across the country. Each regional warehouse 150 consolidates orders for purchasers in a particular geographic area.

In some embodiments, supermarkets SML may use the same approach to allow a user to pre-order groceries (e.g. via the internet), and have them bagged and ready for pickup at the same time as the goods from warehouses 140. This is facilitated by also informing supermarkets SML as to what groceries are being pre-ordered, and when the purchaser will pick up these groceries. This information is provided by internet appliance 100 to supermarkets SML via internet links 121 or 110, and electronic links 135 at the time the groceries are being pre-ordered. (Links 135 are provided between vendors 130 and supermarkets SML. Only a few of links 135 are shown in FIG. 1. One or more computer terminals or PCs including one or more data output devices are provided at supermarkets SML so that personnel at supermarkets SML are made aware of the pre-ordering of groceries.) These PCs can be linked via WAN 450 and/or internet 102 to the rest of the system. Alternatively, these PCs can be linked by one or more other networks, not shown. Vendors 130 also inform supermarkets SML, via links 135, when the goods from vendors 130 are to be delivered. Along with this information, handling instructions may also be sent, e.g. to open and show the purchaser a certain product and let him or her sign a receipt reflecting inspection of the actual product and its function, rather than merely signing a receipt reflecting receipt of just a box.

After the goods are ordered from vendors 130, consolidated and provided to one of supermarkets SML, and/or groceries are ordered from one of supermarkets SML, the purchaser can then come to that supermarket SML, at the mutually agreed time, and pick up both pre-ordered groceries and the goods freshly delivered by vendors 130. The purchaser may also quickly browse the supermarket first, for the few items he or she forgot to pre-order.

In one embodiment, the purchaser may use his credit card, store card or other type of magnetic or electronic card when first stepping into the cash register line. This can be accomplished by passing the card through an electronic card reader to inform appropriate inventory order processing/control automation or personnel of the purchaser's arrival. Thus, by the time the purchaser gets to the register, a bag handler can bring the purchased goods to the register for pickup, ready in a cart, with printed instructions, or instructions on the display of the cash register. An example of a typical printed instruction is an instruction concerning the filling out of a warranty card, instructions concerning use of the product, or an instruction concerning obtaining a cash rebate from a manufacturer.

An additional option is to allow the purchaser to scan his credit card or a store club card at the entrance of supermarket SML, thereby permitting the supermarket to respond by pulling the ordered merchandise to have the merchandise ready at the checkout counter.

When returning an item, the purchaser brings in a receipt and the item to the supermarket SML, and gets credit after the clerk checks return instructions with the vendor. This can be done using one of computer links 135 between supermarket SML and vendors 130. Again, these links 135 can be via WAN 450 or one or more other networks, not shown. Of importance, a method in accordance with one embodiment of the '783 method permits a user to return goods from any of numerous vendors 130 to one location (e.g. one of supermarkets SML), thereby saving the purchaser from the inconvenience of having to make numerous trips to numerous locations.

This method allows so called brick and mortar stores to stay competitive with e-commerce vendors by adopting certain aspects of E-commerce and becoming a one stop service center for purchasers, e.g. open 7 days a week, 24 hours per day. While the above-described method is typically used by supermarkets SML, in other embodiments, it is used by drug stores, convenience stores, or other types of sales establishments. These other types of sales establishments can serve as distribution hubs for many different kinds of goods from the various vendors 130. In lieu of a retail establishment, a warehouse such as warehouse 150 can serve as the pick-up point.

To enhance operation of the system, once orders are accepted, they are immediately transferred from the vendor 130 accepting the order to its warehouse 140, as well as the downstream supermarket SML handling the transaction. The warehouse computer system (designated as 422 in FIG. 1) and/or the supermarket computer system can also manage logistics, such as transportation. There are numerous ways to inter-network multiple servers using WANs such as WAN 450 (which can be the internet) so that any computer or server or cluster of servers can be used to embed any function. In some cases so called proxy servers may be used to interface parts of the system. In other cases, proxy servers, or parts of the service can be outsourced to so-called Application Service Providers (ASPs). In other cases, special protocols, such as XML (extensible markup language) or DHTML (dynamic hypertext markup language) etc. or alternatively "drivers", "pipes", "adapters" etc. can be used. By using any or any combinations of the above listed or similar software elements in any physical combination of servers or equivalents, an essentially equivalent system can be built. Both the physical and logical topology of the system are very flexible, although it is desirable to have the logical topology approximate the physical flow for merchandise to reduce the risk of miscommunication.

In lieu of using a network such as internet 101, in another embodiment, the purchaser contacts store SML and/or vendors 130 by telephone, e.g. using a toll free number such as an 800 number, and using an automatic number identification (ANI) Caller-ID system to identify the purchaser. A server then notifies the store and instructs the store via telephone to ready the merchandise so that by the time the purchaser reaches the store, the merchandise is placed in suitable containers (e.g. bags) for the purchaser to pick up. Systems that can receive a phone call and actuate computer programs are well known in the art, and are sometimes referred to as Interactive Voice Response (IVR), or Voice Response Units (VRU).

A shipping system as described above can be used to make a local, consolidated delivery from one of supermarkets SML (or central warehouse 150) to the purchaser.

The various options for providing goods to purchasers (e.g. pick-up at supermarkets SML or consolidated delivery) are indicated by arrow bundles 160a to 160c, symbolizing the flow of goods out of supermarkets SML.

In another aspect of the '783 method, supermarkets SML can provide bonuses, or enhanced bonuses for pre-ordered items such as staples like milk, bread, flour, etc., since it permits the store to run a tighter inventory, but still meet all the demand. (Such bonuses can be in the form of cash discounts or bonus point programs, wherein the points can be traded in for various products.)

The '783 application further describes an enhanced method in which pickup is arranged using a specially designated area within market SML containing numbered boxes or lockers. When a purchaser arrives at a given time, he or she can pick up his or her merchandise simply by going to an assigned locker and entering a onetime password on a control panel associated with the locker. This unlocks the locker and permits the purchaser to pick up the goods and exit the store without further delay. Lockers are not typically permanently assigned, but rather, are assigned when the pickup time is established. The password can be selected by the vendor or market SML and communicated to the purchaser at the time he or she orders the goods. Alternatively, the purchaser can select the password at the time he or she orders the goods. In yet another embodiment, the purchaser may have a pre-assigned password that is unique to that purchaser, and used for all the purchaser's transactions.

Alternatively, instead of a password, the purchaser scans his store card or credit card with an electronic card scanner/reader located on the locker. (This use of the credit card can also be the means by which the purchased goods are paid for.) This unlocks the locker and permits the purchaser to exit the store without further delay. (The control panel or scanner is typically in electronic communication with a computer system within supermarket SML that receives order information via one of links 135. Thus, the distribution system can control which credit card or pass combination the locker responds to. The distribution system also monitors when pick-up has occurred, and can charge the customer's account upon pick-up.)

Optionally, at the request of the customer, or by default, the customer may be alerted by an alerting system to the availability of his or her goods. The alerting of the customer can be accomplished as described above.

The invention described in the '783 application can be practiced using stores or other commercial establishments other than supermarkets. For example, any type of chain (e.g. regional, local, national or global) that has supply chain management can use a method in accordance with the invention, e.g. drug stores, convenience stores, mail outlets such as the U.S. Postal Service, Mail Boxes etc.™, gas stations, warehouse stores, banks or other chains or franchise outlets that have substantial traffic. In some embodiments, no prior arrangement with the store is required to have products delivered there. Also, the purchaser does not have to have a special preexisting contractual arrangement with the store to receive goods there, other than the specific order that he or she placed via the internet. In this embodiment, the purchaser may or may not incur expense, other than the specific order, to receive goods at the store.

Depending on the type of supply chain management implemented, local or regional centers may not necessarily be owned or operated by a retail chain, but rather by a third party, such as a wholesaler or a large vendor, selling key items such as bread, soft drinks, etc. which require daily deliveries.

Modules for internet-to-supply chain management (SCM) software can be provided that follow preset rules, and invoke auxiliary services, such as instruction printing at the outset of ordering merchandise, warranties, the setup of a software installation (when required), etc. Such software can be partitioned and implemented in many ways, and can be hosted on any of one or several servers, including the servers shown in FIG. 1. The novel approach is to link two or more vendors via the portal function, where the buyer communicates to the vendors what product is being purchased, and how/when it will be delivered or picked up. For simplicity, the pickup/delivery facility within the store (e.g. pick-up boxes) is not shown here in FIG. 1. As described above, more than two vendors can be included in one transaction, which creates synergistic sales and has a single delivery system.

RFID Technology

As mentioned above, RFIDs are tags that can be affixed to or placed in packages so that the package can be readily identified. RFIDs can be queried by sending a radio signal to the RFID. When queried, they provide identification information. RFID tags are described, for example, by Amanda Loudin, "RFID Comes Into Its Own", published by Warehousing Management (http://www.warehousing.com/FEATURES/WM0499F2.HTM), "FASTRAK and OTHER RFID Systems" (http://cwc.ucsd.edu/-chapelle/RFID/rfid.html), "New 13.56 MHz Tag Opens RFID to New Applications Tag Provides High Performance at Low Cost" (http://www.businesswire.com/webbox/bw.020199/983835.htm), and Eric Sells, "New RFID Tag Chip Features Advanced Anti-Collision with Simultaneous Interrogation of 10 Tags" (http://www.microchip.com/0/Company/Edit/pRelease/PR78/index.htm). These documents are being submitted in an information disclosure statement filed herewith and incorporated herein by reference.

Reusable Containers Comprising RFIDs

Figure 2:
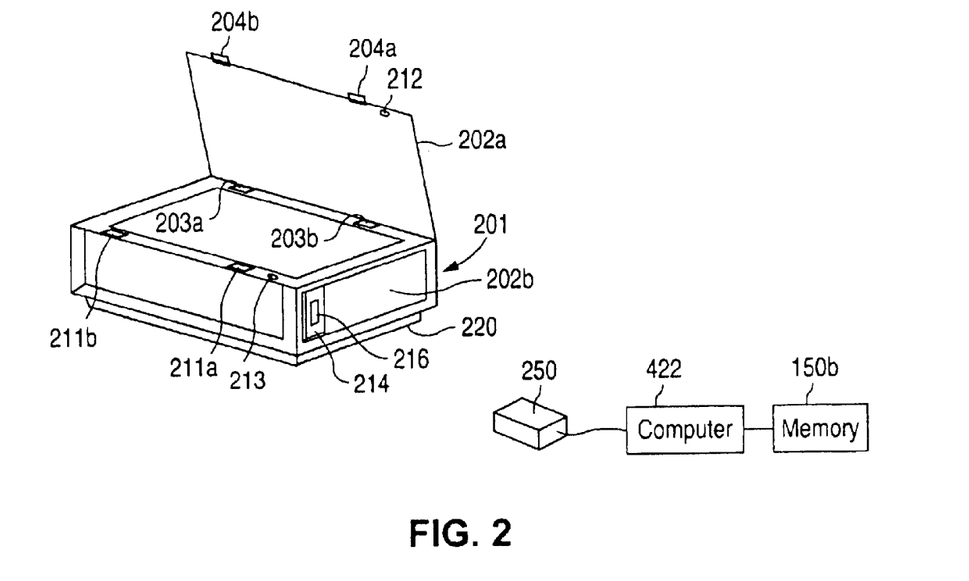
FIG. 2 illustrates an example of a reusable shipping container with an integrated RFID for facilitating tracking.

As mentioned above, in one embodiment, the packages are reusable, e.g. as discussed in our '060 application. Inside the reusable container, air inflatable bags, bubble wrap, Styrofoam "peanuts," or other structures can be used to stabilize and protect the contents. FIG. 2 illustrates an example of such a reusable container or box 201. Referring to FIG. 2, box 201 comprises a cover 202a attached to a bottom unit 202b by two hinges 203a, 203b. Cover 202a also has two latches 204a, 204b, which lock into slots 211a, 211b, respectively, in bottom unit 202b. Holes 212 and 213 in bottom unit 202b and cover 202a line up to allow sealing box 201, for example with a plastic tie or seal.

A compartment 214 within box 201 contains RFID 216. RFID 216 is distance and multi-readable in the preferred embodiment. By distance readable, we mean that RFID 216 can be read by reading apparatus from a distance (typically up to several feet). By multi-readable, we mean that several RFIDs can be read simultaneously or substantially simultaneously. This allows a whole pallet to be scanned at once, for example as it is loaded off or onto a truck. Such scanning can be done at any point along the shipping route or distribution chain, allowing for better tracking at low cost.

Box 201 is designed such that multiple boxes can be securely stacked on one another. For example, in FIG. 2, a foot 220 extends downward from the bottom of box 201. Foot 220 fits into and mates with a cavity in the cover of a box upon which box 201 is stacked. Similarly, box 201 includes a cavity in its top surface to receive the foot 220 of a box placed on top of box 201. (This cavity is not shown in FIG. 2, as it would be on the far side of cover 202a in FIG. 2.)

In one embodiment, the distribution chain can also use boxes that are half the size of box 201. Thus, two half-boxes can be placed together on top of (or below) full size box 201. Similarly, two quarter size boxes can fit on top of (or below) a half size box, and so forth.

Figure 3:
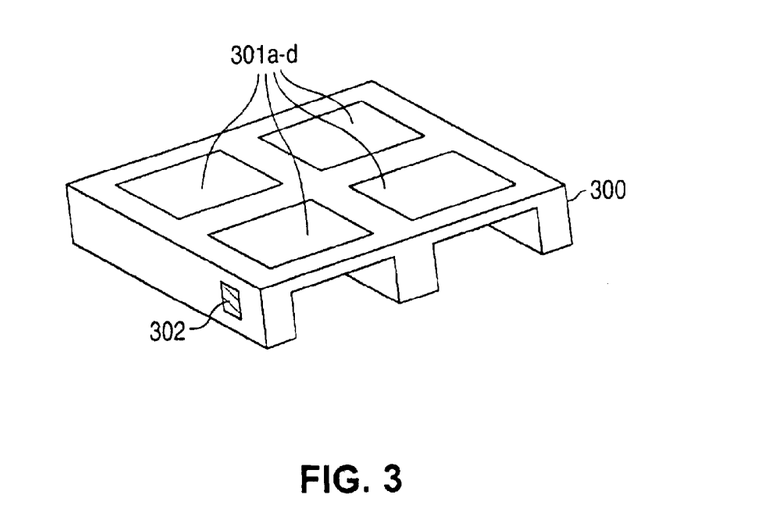
FIG. 3 illustrates a reusable pallet for carrying or holding reusable containers.

FIG. 3 shows a re-usable pallet 300, which comprises cavities 301a–d for receiving e.g. full size boxes. The pallet may also contain an RFID 302 for better inventory tracking. In other words, RFID can be used to track the location of pallet 302.

In one embodiment, there may also be 2 or 3 different heights of boxes in accordance with the invention. For example, there can be standard boxes of a given height, boxes of half that standard height, and boxes of a quarter of that standard height. Thus, when stacking goods on pallet 300, two half height boxes or four quarter height boxes can be stacked adjacent a full height box, allowing the vendor to mix and match many box sizes in a convenient manner on one pallet. If boxes are stacked on a pallet such that the total height of the boxes exceeds a certain height, the pallets may be shrink-wrapped to further stabilize them. Since the RFID allows scanning of all units on a pallet without physically reaching it, even RFIDs affixed to boxes buried within the pallet load can be scanned and inventoried.

The goods for a given purchaser are typically loaded into box 201 at warehouse 150 (although they could also be loaded into box 201 at warehouses 140 or supermarket SML). At this time, a scanner 250 (FIG. 2) is used to read identification information from RFID 216, and that identification information is entered into a memory device, along with information corresponding to the purchaser who is to receive the box. The memory device can be a memory disk, memory tape, a semiconductor memory, or some other type of memory device 150b (FIG. 1). Memory device 150b typically contains data base 421a–n. FIG. 1 shows that the memory device (reference number 150b) is located at warehouse 150 and linked to computer 422, but its physical location is not critical to the present invention. Memory device 150b and computer 422 could be located anywhere, but it is preferably electronically linked to the location where goods are being placed in box 201. Also, preferably, different computer systems and servers throughout the distribution channel preferably have access to memory device 150b so that the location of box 201 can be tracked from numerous points in the distribution channel.

Scanner 250 can be a hand-held scanner coupled to computer 422 either with a wire, or without a wire (e.g. using an IR or radio wave communication link). Computer 422 is coupled to memory device 150b.

The RFID within box 201 can be scanned when it leaves warehouse 150 (or 140) and when it arrives at supermarkets SML, as well as at various points along the way. When this occurs, information in memory 150b (e.g. databases 421a–n) can be updated so that the progress of the order can be tracked. Memory 150b is also updated when box 201 is provided to the purchaser and when the purchaser returns box 201.

While the invention has been described with respect to specific embodiments, those skilled in the art will appreciate that changes can be made in form and detail without departing from the spirit and scope of the invention. For example, the list of the transactions can be provided by a computer coupled to an output device located in truck 401 instead of using computer 412 in store 410. The list can be generated in the form of a hard copy output (e.g. paper) or a non-hard copy output (e.g. on a computer screen). Wireless communications apparatus can be provided for enabling the computer in the truck to obtain and update databases 421a–n and 431a–n.

In lieu of RFID tags, devices other than RFID tags that provide an identification signal when queried can be used. These tags can be responsive to signals other than RF signals, e.g. IR (infrared) signals.

It should also be appreciated that different novel aspects of the above-described system, apparatuses and methods can be practiced independently or in conjunction with each other. Accordingly, all such changes come within the present invention.

We claim:

1. A system comprising:
    a delivery vehicle;
    a set of packages within said vehicle, said packages having a signal responsive tag;
    a transmitter for querying one of the signal responsive tags within said vehicle to thereby locate the package corresponding to said signal responsive tag, said signal responsive tag emitting a signal in response to said querying; and
    at least one light beam source for pointing to said package with a light beam, the direction of said light beam being in response to said signal.

2. A system comprising:
    a delivery vehicle;
    a set of packages within said vehicle, said packages having at least one signal responsive tag;
    a transmitter for querying one of the tags within said vehicle to thereby locate the package corresponding to said tag, said tag generating a signal in response to said querying; and
    at least one light beam source for identifying a package corresponding to said queried tag by pointing toward said package in a direction responsive to said signal generated by said tag.

3. Method for locating a package within a vehicle comprising:
    providing a signal for querying a signal responsive tag, said tag being within or affixed to said package within said vehicle;
    receiving a reply signal from said tag;
    determining the location of the tag in response to the reply signal and indicating the location of the tag using one or more light beams for pointing toward the tag, the direction of said light beams being responsive to said reply signal.

4. Method of claim 3 wherein said tag is an RFID.

5. A system comprising:
    a set of objects, said objects having a signal responsive tag;
    a transmitter for querying one of the tags to thereby locate the object corresponding to said tag, said tag generating a signal in response to said querying; and
    at least one light beam source for identifying said object corresponding to said queried tag by pointing toward said object in a direction responsive to said signal generated by said tag.

6. System of claim 5 wherein said tags are RFIDs.

7. Method for locating an object comprising:
    providing an object, said object having a signal responsive tag;
    providing a signal for querying said signal responsive tag;
    receiving a reply signal from said tag; and
    determining the location of the tag in response to the reply signal and indicating the location of the tag using one or more light beams, said one or more light beams pointing toward the object corresponding to said queried tag in a direction responsive to said reply signal.

8. Method of claim 7 wherein said tag is an RFID.

* * * * *